(No Model.)
S. LONERGAN.
Saw Gage.
No. 232,989.  Patented Oct. 5, 1880.
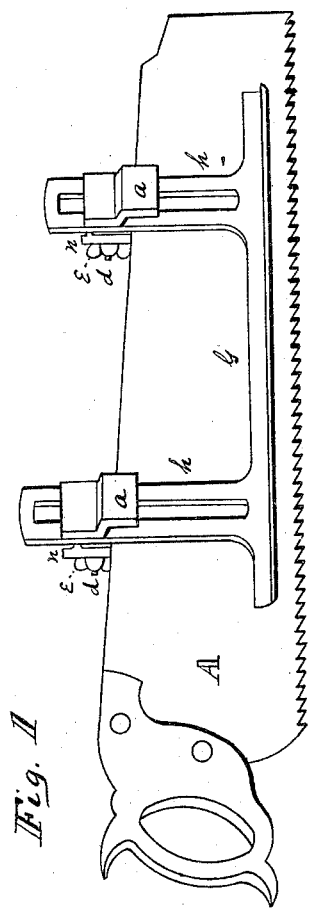
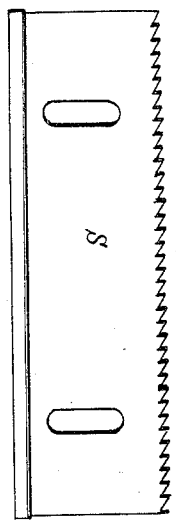
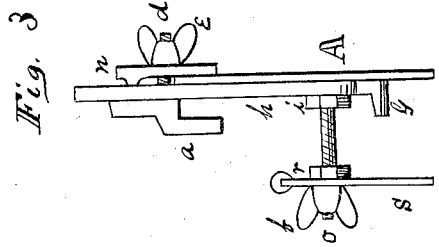
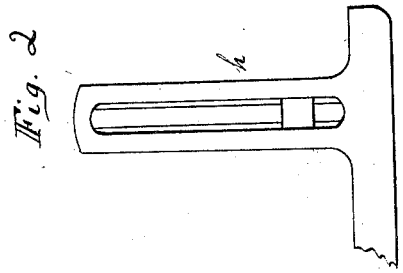
Witnesses:
O. Frank Bly,
Patrick Cunningham.
Inventor:
Stephen Lonergan,
by H. W. Mason, Atty.

UNITED STATES PATENT OFFICE.

STEPHEN LONERGAN, OF LEWISTON, MAINE.

SAW-GAGE.

SPECIFICATION forming part of Letters Patent No. 232,989, dated October 5, 1880.

Application filed July 26, 1880. (No model.)

*To all whom it may concern:*

Be it known that I, STEPHEN LONERGAN, of Lewiston, Maine, have invented a new and novel Saw-Gage, of which the following is a specification.

The object of my invention is to provide a device to be attached to a hand or back saw, whereby the cut is exactly regulated to any required depth.

I attain this object by the mechanism illustrated in the accompanying drawings, in which—

Figure 1 is a view, in perspective, of the gage attached to a hand-saw as it appears after the removal of the studs which are used for attaching a second saw. Fig. 2 is a view of the reverse side of one of the slotted arms of the gage, showing the head of one of the studs before mentioned resting in the offset made in the edges of the slot to receive it. Fig. 3 is a front view of the gage attached to a hand-saw, with the second saw in position, and showing the front stud. Fig. 4 is a side view of the second saw, showing the slots in the same, through which the studs pass.

Similar letters refer to similar parts throughout the several views.

The bar G, Fig. 1, furnished with the slotted arms $h\ h$, is clamped to the blade of the saw A in a manner which will readily be seen by reference to Fig. 3, in which the block $a$ is furnished with a screw-threaded projection, $d$, which passes through the slot in the arm $h$, and also through a perforation in the clip $n$. The thumb-nut $e$ is then screwed down upon the projection $d$ until the blade of the saw A is firmly clamped between the slotted arm $h$ and the clip $n$.

It will be observed that the block $a$ has an offset. When the gage is to be used on a back-saw the back of the saw is placed between this offset and the slotted arm $h$, and clamped there by means of the thumb-nut $e$. The arms $h\ h$ are slotted to enable the gage to be adjustable to any required position, so that the saw will make a deep or shallow cut.

When it is desired to use a second saw—as, for instance, in cutting gains—the studs $o$ (only one of which is shown in the drawings) are adjusted to any required position in the arms $h$, and clamped there by means of the nuts $i$, the studs being screw-threaded throughout their length. The nuts $r$ are then adjusted so that the second saw shall be the requisite distance from the blade of the saw A. The second saw, $s$, is then clamped firmly in place by tightening the thumb-nuts $b$. The perforations in the saw-blade $s$, through which the studs $o$ pass, are elongated vertically, so that it may be partly adjusted in that direction.

What I claim, and desire to secure by Letters Patent, is—

The saw-gage herein described, composed of the bar G, having slotted arms $h\ h$, said arms having suitable clips for clamping the gage to the saw-blade, and having removable studs $o$, provided with nuts $i$ and $r$, and thumb-nut $b$, all for the purpose shown and described.

STEPHEN LONERGAN.

Witnesses:
 DANIEL FINN,
 JOHN RILEY.